(12) United States Patent
Lynch

(10) Patent No.: US 6,849,673 B2
(45) Date of Patent: Feb. 1, 2005

(54) FILM FORMING COATING COMPOSITION CONTAINING SURFACE TREATED BARIUM SULFATE, AND METHODS OF USE

(75) Inventor: Thomas J. Lynch, Roswell, GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 10/611,548

(22) Filed: Jul. 2, 2003

(65) Prior Publication Data

US 2005/0004268 A1 Jan. 6, 2005

(51) Int. Cl.[7] .................................................. C08K 3/30
(52) U.S. Cl. ...................................... 523/213; 524/423
(58) Field of Search ............................ 524/423; 523/213

(56) References Cited

U.S. PATENT DOCUMENTS

| | | | |
|---|---|---|---|
| 3,849,187 A | * 11/1974 | Fetscher et al. ............. | 257/786 |
| 3,944,705 A | 3/1976 | Fujioka et al. | |
| 4,171,228 A | 10/1979 | Lowrey | |
| 4,250,074 A | 2/1981 | Foscante et al. | |
| 4,263,051 A | 4/1981 | Crawford et al. | |
| 4,505,755 A | * 3/1985 | Shinozuka et al. ......... | 106/431 |
| 4,551,497 A | 11/1985 | Shinozuka et al. | |
| 4,818,614 A | 4/1989 | Fukui et al. | |
| 5,393,437 A | 2/1995 | Bower | |
| 5,401,570 A | 3/1995 | Heeks et al. | |
| 5,492,980 A | * 2/1996 | Moriwaki ................... | 525/429 |
| 6,101,360 A | * 8/2000 | Hara et al. .................. | 399/308 |
| 6,194,070 B1 | 2/2001 | Lynch et al. | |
| 6,417,292 B1 | * 7/2002 | Moriarity et al. ........... | 525/440 |

FOREIGN PATENT DOCUMENTS

| | | |
|---|---|---|
| EP | 0 716 350 B1 | 6/1996 |
| JP | 53-101038 | 9/1978 |
| JP | 5-112430 | 5/1993 |
| JP | 8-215301 | 8/1996 |
| JP | 8-268840 | 10/1996 |
| JP | 9-3211 | 1/1997 |
| JP | 10-45523 | 2/1998 |

* cited by examiner

*Primary Examiner*—Margaret G. Moore
(74) *Attorney, Agent, or Firm*—Carlos Nieves

(57) ABSTRACT

A coating composition comprising, in admixture, a resin and aminosilane surface-treated barium sulfate particles, and methods of using it as a film forming coating. Low blistering, highly corrosion resistant and low viscosity coating compositions are provided.

30 Claims, 3 Drawing Sheets

744 Hours
5% Salt Spray

744 Hours
5% Salt Spray

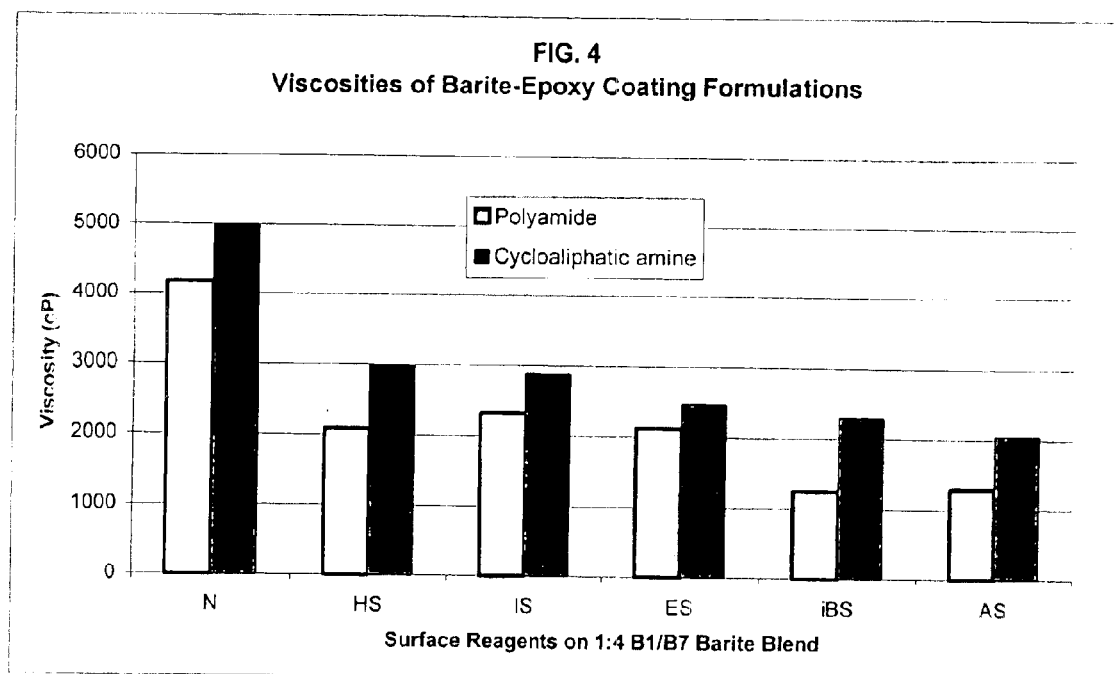

FILM FORMING COATING COMPOSITION CONTAINING SURFACE TREATED BARIUM SULFATE, AND METHODS OF USE

BACKGROUND OF THE INVENTION

1. Field of the Invention

This invention relates to a coating composition containing barium sulfate having an aminosilane surface treatment, and methods of using the coating composition as a protective coating.

2. Description of the Related Art

Protective surface coatings are used in a wide variety of applications to provide a thin film barrier between the surface of a body needing protection and its immediate surrounding environment. Protective coatings of this sort have been used, for instance, on marine, aircraft, and industrial structures and parts. These protective coatings often are formulated to include a curable organic medium, pigments, and inorganic filler particles dispersed within the medium.

It is well known that the proper selection of the pigments, as differentiated from the fillers, has a profound influence on protective and other functional properties of protective coatings. The pigments provide many of the essential properties of the coating such as color, corrosion protection, durability and special rheological properties that address the practical aspects of coating application such as ease of application and firm build. Many conventional fillers used in coatings are commodities having lower cost than the base resin of the coating. For this reason, fillers are often used to reduce the cost of the coating.

The traditional coating requirements of increased performance, reduced cost, as well as compliance with regulations drive much of new coatings formulation, and are largely responsible for the elimination of the older thermoplastics (lacquers) and the increase in higher solids thermosets and water borne technologies, as well as more revolutionary advances.

In particular, regulation compliance is driving two of the most important coating formulations changes, which are (1) the elimination of corrosion resistant inhibitive coating systems based on lead and hexavalent chromium because of toxicity considerations, and (2) the reduction in the volume used of volatile organic compound (VOC) solvents and diluents, which are released directly into the atmosphere in many coating applications. Any coating additive that attenuates the need for toxic corrosion inhibitors or permits lower solvent and diluent usage, and thus permits use of lower levels of VOCs, is highly desired.

The more recent coatings have serious drawbacks. For example, the more recently introduced safer corrosion inhibitors are either not as effective or as universally applicable as the traditional corrosion inhibitors, such as lead and the hexavalent salts of chromium. This has resulted in a swing away from coating systems based on inhibitive pigments toward coatings that incorporate sacrificial pigments such as zinc. This second approach also has limitations. Zinc-rich technologies require good contact between the steel of the substrate and this limits these systems to new steel or old steel that has been blasted clean. Old steel that is covered with lead and chromium based coatings must first be blasted clean which undesirably puts lead and chromium debris into the environment. Attempts to contain the debris and its removal and disposal as hazardous material is excessively costly and severely impedes any impetus towards such surface preparation and the use of such zinc-rich coatings on steel covered with lead or chromium based coatings.

A third technique to combat corrosion is the barrier technique. Barrier coatings protect metallic substrates by interposing an oxygen and ionic barrier between the substrate and the environment and ensures that any water that does penetrate the film is filtered of all ionic material so that the electrical resistance of any underfilm electrolyte is too high to allow the establishment of a corrosion current.

Barrier coatings have traditionally been formulated with flat platy pigments (aluminum and stainless steel flake, mica, micaceous iron oxide, talc, glass flake etc.). The flat, platy pigment shape is believed to enhance the barrier properties of the coating. Unfortunately, many of these pigments have two important defects. First, they are often reactive and sensitive to various chemical species. For example, aluminum is sensitive to acids and alkalis, while glass flake may be affected by alkalis. Secondly, they are notoriously high in oil absorption because of their high surface area and therefore make high viscosity coatings that cannot be applied without large solvent additions (high VOC).

Therefore, a need still exists for enhanced barrier and corrosion performance with respect to resin-based thin film forming protective coatings while also providing acceptably low VOC contents and reduced health and environmental risks.

The use of barium sulfates pretreated with organosilanes in bulk thermoplastic polymers has been described, such as in U.S. Pat. No. 6,194,070 and by Wang, K., et al., Effect of Interfacial Interaction on Theological and Crystalline Behavior of Polypropylene/$BaSO_4$ Composites, ACTA Polymerica Sinica, No. 6, Dec. 2001, 697–700.

SUMMARY OF THE INVENTION

The present invention relates to a film forming coating composition that includes barium sulfate having an aminosilane surface treatment in combination with a resin, and this coating composition is environmentally friendly and forms a coating film having unexpectedly superior barrier, wet adhesion, and blister-resistant properties.

In one aspect, the film forming coating composition forms films endowed with high resistance to blistering as compared to similar coating compositions except containing barium sulfate that has not been surface treated or alternatively has been surface treated with surface chemistry other than aminosilane. In addition, the film forming coating composition also provides excellent corrosion resistance. This attribute helps eliminate the need for use of undesirable metal pigments for corrosion control.

Surprisingly, the coating compositions of this invention also have been observed to have relatively low viscosities that are well suited for coating applications. These viscosity reductions are directly attributable to the presence of the aminosilane surface treated barium sulfate, as has been demonstrated by experimental studies described herein comparing coating compositions including that component to similar coating compositions except containing barium sulfate that has not been surface treated or alternatively has been surface treated with a surface treatment chemistry other than aminosilane. These viscosity reductions exceed 50% in some embodiments that have been observed. By inducing lower viscosity, the presence of the aminosilane surface treated barium sulfate in the coating composition makes it possible to reduce the amount of solvent or diluent otherwise needed to thin the coating composition to that viscosity required for easy application, which in turn reduces volatile organic compound (VOC) content in the coating compositions.

For purposes herein, the term "aminosilane" generally relates to amino-moiety containing organosilanes. These organosilanes can contain primary, secondary, and/or tertiary amine moieties. In one embodiment, the barium sulfate is used in a finely divided form, such as particles having a median particle size of about 0.1 to about 40 microns. In one embodiment, the organosilane containing an amino moiety is added onto the surface of the barium sulfate when surface treated with the organosilane in an amount of about 0.1% to about 2% by weight, and particularly about 0.25% to about 1.5% by weight, based on dry weight of the barium sulfate before the addition. In one embodiment, the barium sulfate particles are pretreated with an aminosilane compound before their introduction into a coating composition. In another embodiment, the aminosilane can be deposited on the barium sulfate via a liquid medium into which both have been dispersed.

In one embodiment, the resin component of the coating compositions is a curable resin that is susceptible to being crosslinked to form a thermoset resin in a thin film form of the coating composition. The curable resin can be, for example, an epoxy resin, an isocyanate based urethane or urea resin, an alkyd resin, a thermosetting acrylic (copolymer) resin, a polyester resin, a phenolic resin, a thermosetting polyvinyl resin, a blocked isocyanate resin, and so forth, and mixtures of these. The term "curable" means a monomer, oligomer, or polymer that forms a higher molecular weight polymeric chain and/or network when crosslinked. In one embodiment, the curable resin is a crosslinkable resin forming a thermoset. "Crosslinking" means the setting up of chemical links between molecular chains of a resin to form a three-dimensional network polymer system. Crosslinking generally toughens and stiffens the coatings. A "thermoset" is a resin, when cured by application of heat, chemical or other crosslinking inducing or promoting means, changes into a substantially infusible and insoluble material. Thermosetting resins may soften but will not dissolve in any solvents, unlike thermoplastic resins. The coating composition can include curing agents or initiators or accelerators as applicable or needed.

The coating film prepared from a coating composition of embodiments of this invention that includes a curable resin hardens as the resin or binder cures, and thus becomes more durable, among other attributes.

In another embodiment, the resin included in the coating composition is a thermoplastic resin. The thermoplastic resins possess long mostly unbranched backbones held close together to each other by secondary valency bonds. The thermoplastic resins can be, for example, polyacrylics, polyvinyl resins, and so forth.

In yet another embodiment, the resin included in the coating composition provides a coalescing system, which is a water-based coating in which the film forms when water evaporates from an emulsion or latex system. As evaporation occurs, adjacent latex particles come into contact with each other and fuse to form a solid film. In this aspect, the emulsion or latex can contain precured solids comprising thermoset or thermoplastic particles.

The coatings can be air-dried or baked coatings. For purposes herein, a "coating", is a liquid or mastic composition that is converted to a solid protective, decorative, or functional adherent film after application as a thin layer.

In one embodiment, the coating compositions can be in the form of a dispersion coating, emulsion, or latex. The compositions of the present invention form durable continuous dried thin films that generally can have an average film thickness, upon drying, of about $1 \times 10^{-3}$ to about $25 \times 10^{-3}$ inch, more particularly about $2 \times 10^{-3}$ to about $15 \times 10^{-3}$ inch.

In one preferred embodiment, the coating composition resin system comprises a curable resin side and a curing agent side. The pigment is dispersed in either the curable resin side or the curing agent side or both. In a particular embodiment, the coating composition is a two part epoxy resin coating system comprised by a curable epoxy resin in one part and an amine hardening agent included in a second part, which upon admixture induces curing and hardening of the epoxy resin. The surface treated barium sulfate, and any other pigments, can be included in either or both parts. In one preferred embodiment, it is included in the component bearing a functional group that reacts with the amine, such that the pigment is chemically bound into the matrix before the matrix is completed. The epoxy or other curable resin included binds the additive particles together to form a film. For purposes herein, a "film" can be comprised of one or more layers of coating covering an object or surface.

In addition to its viscosity reducing and other beneficial effects, the surface-treated barium sulfate also can be used as a filler in the coating compositions. Therefore, the surface treated barium sulfate can be multifunctional as used in the coating compositions. Other mineral based pigments and fillers optionally can be included with it in the coating composition. Colored organic and inorganic pigments may also be used to color the product. The coating compositions also optionally can contain commonly used chemical additives for protective coating compositions such as corrosion, oxidation, drying, and/or skinning retardants, stabilizers, ultraviolet absorbers, thixatropes, and flow control additives.

The film forming coating compositions of this invention are ready-to-use formulations that can be applied and distributed over a portion of a surface or substrate to be coated by any convenient method and means. The coating compositions of the present invention can be readily formulated in flowable liquid form. They can be used, for example, as anticorrosive primers, chemical resistance coatings, sealers, top coats, varnishes, and tank linings. These coatings can be applied to a surface by spraying, brushing, dipping, or rolling, or any other suitable technique. Applications of the coating compositions include metal corrosion protection (e.g., marine, pipelines, tanks, and the like), waterproofing (e.g., fabrics, concrete), mechanical protection (e.g., optical surfaces, indoor flooring), and electrical insulation (e.g., wires). In one preferred aspect, the coating compositions are useful as protective coatings, such as surface coatings and linings, such as applied to surfaces of solid metallic substrates.

The present invention also encompasses methods of application of the coating compositions described herein.

BRIEF DESCRIPTION OF THE DRAWINGS

FIG. 2 is a control epoxy binder containing unmodified barium sulfate and FIG. 3 is an epoxy binder containing aminosilane treated barium sulfate according to an embodiment of the invention.

FIG. 4 is a graph representing viscosity profiles of a series of two-part epoxy binder compositions comprising epoxy and amine curing agent components containing dispersed barium sulfates that had been previously surface treated with one of several different types of organosilanes including one test run treated with aminosilane ("AS"), and which were further compared to a control composition ("N") including epoxy binder containing unmodified barium sulfate dispersed in the epoxy.

DETAILED DESCRIPTION OF PREFERRED EMBODIMENTS

Figure 1:
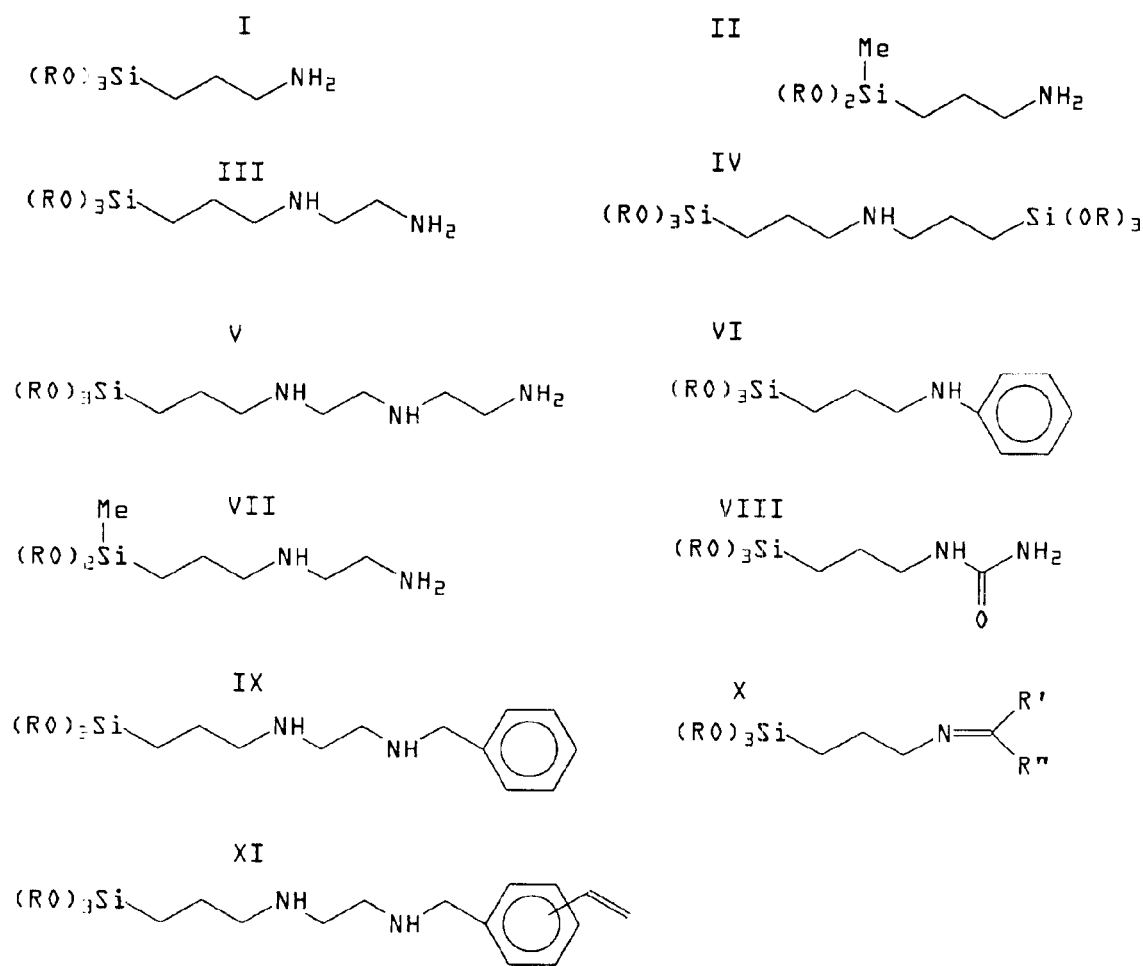
FIG. 1 illustrates exemplary, non-limiting aminosilane compounds I to XI useful in surface treating barium sulfate particles used as an additive in film forming coating compositions according to embodiments of this invention.

The present invention is directed toward a film forming coating composition containing a resin and a surface treated barium sulfate particulate product that provides improved barrier, wet adhesive, blister resistant, anti-corrosion protection in polymeric coating applications, and in a more environmentally friendly manner by reducing VOC requirements of the coating compositions.

Surface Treated Barium Sulfate

In one embodiment, the barium sulfate particles are pretreated with an aminosilane compound before their introduction into a coating composition. The method includes mixing an aminosilane, in neat or in aqueous emulsion or solution form, with a quantity of barium sulfate particles, and then optionally drying the resultant mixture. In this manner, the aminosilane is deposited on and chemically condenses on the exterior surface of the barium sulfate particles. The aminosilane compound binds to the surface of the barium sulfate particles through hydrolysis and condensation.

The treatment level of the aminosilane compound on the barium sulfate component of the coating composition generally can range from about 0.1% to about 2.0% by weight, and particularly is from about 0.25% to about 1.5% by weight, based on dry weight of the barium sulfate before the addition.

The organosilanes containing the amino moiety used to surface treat the barium sulfate component of the coating compositions can be silane compounds having primary, secondary, and/or tertiary amine moieties. In one embodiment, the organosilane includes an amino-moiety that is a primary amine.

An illustrative example of the chemical structure of a class of aminosilanes useful in preparing the surface treated barium sulfate products of this invention is set forth immediately below as Structure 1A:

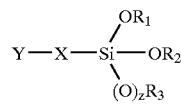

1A where $R_1$, $R_2$, $R_3$ each independently is selected from hydrogen, lower alkyl, aryl, lower alkylaryl, or lower arylalkyl, z is 0 or 1, Y is selected from the group consisting of a substituted or nonsubstituted amino-containing group, and X is a non-substituted or substituted hydrocarbenyl linking group. "Lower alkyl" means a C1 to C6 alkyl group. In a more particular embodiment, z is 1, and $R_1$, $R_2$, and $R_3$ each independently is lower alkyl or aryl (but not hydrogen), and Y is $-NH_2$.

Non-limiting examples of the aminosilane include 3-aminopropyltriethoxysilane (i.e., referring to structure 1A: Y is $-NH_2$, X is $-(CH_2)_3-$, z is 1, and $R_1$, $R_2$, and $R_3$ each is $-C_2H_5$. A non-limiting example of an organosilane having an amino moiety of Structure 1A is 3-aminopropyltriethoxysilane.

The coating composition generally includes pigment in an amount of about 1 to about 65% by volume, particularly about to about 55% by volume of the coating without solvents. The surface treated barium sulfate, in turn, comprises about 1 to about 100% by volume of the pigment, particularly about 10 to about 70% of the total volume of the pigment. Based on the dry weight of the coating composition, the barium sulfate particles comprise about 1 to about 90%, particularly about 20 to about 55%, of the dry weight of the coating composition.

In one embodiment, the barium sulfate used as the substrate for the organosilane compound containing the amino moiety is used in a finely divided form, such as in fine particle form. In one aspect, the barium sulfate particles have a median particle size of about 0.1 to about 40 microns.

Naturally occurring barium sulfate, which are also commonly referred to as barite or barytes, is frequently used as an extender pigment in coatings and composites due to its chemical inertness in both acid and alkali environments, high refractive index, high brightness, low abrasiveness, low oil absorption, high density, and resistance to corrosion. The term "barite" is occasionally used herein interchangeably with the term barium sulfate. Synthetic, precipitated barium sulfate pigments are typically available in finer particle size grades versus the mechanically ground, natural barium sulfates. Precipitated barium sulfate is commonly referred to as blanc fixe.

In a preferred embodiment, a dry ground natural barium sulfate is subsequently surface treated with an organosilane having an amino moiety prior to introduction to a coating composition in a manner more fully described below. However, it should be noted that precipitated barium sulfates or wet ground barium sulfates can also be surface treated by the inventive method to yield similar benefits.

Table I sets forth some mineral properties of a typical dry ground barium sulfate that can be used as a starting material for the practice of this invention. Table II sets forth some physical properties of four different, dry ground barium sulfate products available under the mark Huberbrite® from J. M. Huber Corporation, which can be used in practicing this invention.

TABLE I

| Mineral Properties | |
| --- | --- |
| Morphology | Blocky |
| Refractive Index | 1.64 |
| Specific Gravity | 4.50 |
| Mohs Hardness | 3.0–3.5 |
| Linear Coefficient of Expansion ($10^{-6}/°$ C.) | 10 |
| Solubility (g/100 ml) | 0.00025 |
| Dielectric Constant | 11.4 |
| Bulking Value (gal/lb) | 0.027 |

TABLE II

| | Huberbrite 1 | Huberbrite 3 | Huberbrite 7 | Huberbrite 10 |
| --- | --- | --- | --- | --- |
| General Specifications | | | | |
| Moisture %, 105° C. (max) | 0.20 | 0.10 | 0.10 | 0.10 |
| Screen residue, 325 mesh (max), % | 0.05 | 0.05 | 0.1 | 0.6 |
| pH (100 g/250 ml $H_2O$) | 8.5–9.5 | 8.5–9.5 | 8.5–9.5 | 8.5–9.5 |

TABLE II-continued

|  | Huberbrite 1 | Huberbrite 3 | Huberbrite 7 | Huberbrite 10 |
|---|---|---|---|---|
| Dry brightness, % reflectance | 94 | 94 | 94 | 93 |
| Hegman Grind | 6.5 | 6 | 4 | 3 |
| Typical Physical Properties |  |  |  |  |
| Form | Fine Powder | Fine Powder | Fine Powder | Fine Powder |
| Avg. Stokes equiv. particle diameter, microns | 1.1 | 3.0 | 6.5 | 8.5 |
| Median particle size, LLS, microns | 0.9 | 2.1 | 5.8 | 8.1 |
| Surface area, BET ($m^2/g$) | 3.6 | 1.4 | 0.6 | 0.5 |
| Oil absorption (g/100 g) | 13 | 12 | 10 | 8.5 |
| Bulk density, loose ($lb/ft^3$) | 60 | 80 | 90 | 100 |
| Bulk density, tapped ($lb/ft^3$) | 90 | 110 | 120 | 130 |

The physical and chemical data reported herein were determined as follows. Specific gravities were determined by helium gas displacement using a Quantachrome 1000 automated pycnometer unit. The moisture content on the barium sulfate in wt. % was determined by drying test samples in a forced air oven at 105 deg. C. for approximately 2 hours in accordance with the TAPPI Method T671 cm-85 procedure. Screen residue values for an untreated barium sulfate were measured by pouring a well-mixed slurry of the barium sulfate through a 325 mesh screen, rinsing, drying and weighing the residue, following the ASTM D-185 procedure. Barium sulfate pH values were determined using a standard pH meter on a 28% solids (by weight) mixture of the barium sulfate with deionized water in accordance with the ASTM D-1208, E-70 procedure.

Dry pigment brightness values in Table II were measured at 530 nm with a magnesium oxide standard equal to 100%, following the ASTM C-110 procedure. Hegman grind values were determined following the standard ASTM D-1210 procedure. The average Stokes equivalent particle diameters in microns were determined by an x-ray sedimentation method based on Stokes Law using a Micromeritics 5100 Sedigraph particle size instrument. The average Stokes equivalent particle diameter is the median particle size (MPS) value determined by the x-ray Sedigraph. The median particle size values, measured by the laser light scattering (LLS) method and reported in microns, were determined using a Malvern Mastersizer/E instrument which is based on Fraunhofer diffraction as generally described in U.S. Pat. No. 5,167,707, incorporated herein by reference, and references cited therein. BET surface areas were determined by the nitrogen absorption method described by Brunauer, Emett, and Teller in the "Journal of the American Chemical Society," Volume 60, page 309, published in 1938. A multi-point surface area determination was made on the barium sulfate test samples after outgassing them at 130 degrees Celsius using a Micromeritics Gemini III 2375 instrument. Oil absorbance values were determined from the grams of linseed oil absorbed per 100 grams of pigment by the rub-out method of ASTM-D.281. Loose and tapped bulk densities were determined by the procedures described in ASTM D-1895.

In one preferred embodiment, Huberbrite® 1 or Huberbrite® 7 commercial barium sulfate is used singly, or as blend of these, as the barium sulfate substrate powder that is surface treated with an organosilane having an amino moiety in accordance with embodiments of the present invention. This range of barium sulfate particle sizes are well suited for coating compounds since the fineness of the particles is important to the resultant Hegman grind values and coating viscosities.

Of the most chemically inert pigments, few are platy. Barium sulfate is nodular in shape, and while this pigment is, like silica, very chemically resistant, the nodular shape does nothing to enhance the barrier properties of the film. It is therefore surprising that non-platy barium sulfate can be modified to impart high barrier properties by surface modification. It is further surprising that organosilanes having chemically active groups can be used to modify barium sulfate, which seemingly would not be expected to interact or react with the chemically inert barium sulfate surface.

Resin

In one embodiment, the resin is a curable resin that is a binder material susceptible to being crosslinked to form a thermoset resin that binds the ingredients of the coating composition together to form a thin film. The curable resin will be included in sufficient amounts in the coating composition for this purpose.

The coating film hardens as the resin or binder cures, and thus becomes more durable among other things. The coatings can be air-dried or baked coatings. In one embodiment, the coating compositions can be in the form of a dispersion coating, emulsion, or latex.

As indicated, the curable resin is a crosslinkable resin forming a thermoset. Crosslinking generally toughens and stiffens the coatings. Thermosetting resins may soften but will not dissolve in any solvents, unlike thermoplastic resins. The coating composition can include curing agents or initiators or accelerators as applicable or needed. The curable resin generally composes about 1 to about 90 weight %, particularly about 10 to about 30 weight %, of the coating composition.

For purposes of the coating composition, the curable resin can be, for example, an epoxy resin, an epoxy ester, an isocyanate based urethane or urea resin, an alkyd resin, a uralkyd resin, a thermosetting acrylic (copolymer) resin, a polyester resin, a phenolic resin, a thermosetting polyvinyl resin, a blocked isocyanate resin, and so forth, and mixtures of these.

In one embodiment, curable organic film-forming binders are used that are suitable for aqueous coating compositions, which are, for example, 2-component epoxy resins; alkyd resins; polyurethane resins; polyester resins, which are usually saturated; water-dilutable phenolic resins or derived dispersions; water-dilutable amino-formaldehyde resins; and hybrid systems based on epoxy acrylates. Other resins that can be used include acrylic resins and resins based on vinyl-acrylic copolymers.

Preferred epoxy resins are those based on aromatic polyols, especially those based on bisphenols. The epoxy resins are employed in combination with crosslinking agents. The latter may in particular be amino- or hydroxyfunctional compounds, an acid, an acid anhydride or a Lewis acid. Examples thereof are modified and unmodified aliphatic, aromatic and cycloaliphatic polyamines, polyamides, polyamidoamines, polyxylyene amines, Mannich Bases, polyoxyalkylamines polymers based on polysulfides, polyphenol- and amino-formaldehyde resins, boron trifluorides and their complex compounds, polycarboxylic acids, 1,2-dicarboxylic anhydrides, or pyromellitic anhydride. In combination with appropriate polyamine crosslinking agents, water-dilutable epoxy resins exhibit excellent mechanical and chemical resistance. The use of solid resins or solid-resin dispersions normally requires the addition of small amounts of solvent in order to improve film formation.

In one preferred embodiment, the coating composition resin system comprises a curable resin side and a curing agent side. The pigment is dispersed in either the curable resin side or the curing agent side. In a particular embodiment, the coating composition is a two part epoxy resin coating system comprised by a curable epoxy resin in one part and an amine hardening agent included in a second part, which upon admixture induces curing and hardening of the epoxy resin. The surface treated barium sulfate, and any other pigments, may be included in either or both parts. The epoxy or other curable resin included binds the additive particles together to form a film.

The alkyd resins can be water-dilutable alkyd resin systems which can be employed in air-drying form or in the form of stoving systems, optionally in combination with water-dilutable melamine resins; they may also be oxidatively drying, air-drying or stoving systems which can be employed optionally in combination with aqueous dispersions based on acrylic resins or their copolymers, with vinyl acetates, and so forth.

Polyurethane resins are derived from polyethers, polyesters, polyacrylic, polycaprolactam and other polyols, and polybutadienes with terminal hydroxyl groups, on the one hand, and from aliphatic or aromatic polyisocyanates on the other hand. Other hydrogen donors could be used, such as amines giving polyureas, thiols, and so forth. Suitable phenolic resins are synthetic resins in whose synthesis phenols are the principal component, i.e. in particular phenol-, cresol-, xylenol- and resorcinol-formaldehyde resins, alkylphenolic resins, and condensation products of phenols with acetaldehyde, furfurol, acrolein or other aldehydes. Modified phenolic resins also can be used.

Other types of resins alternatively or in combination with the curable resins can be used. For instance, thermoplastic resins and/or resins supporting coalescing systems can be used. Examples of thermoplastic resins include, for example, acrylic resins that are pure acrylic resins, epoxy acrylate hybrid systems, acrylic acid or acrylic ester copolymers, combinations with vinyl resins or copolymers of vinyl monomers such as vinyl acetate, styrene or butadiene. These systems can be air-drying or stoving systems. Examples of suitable polyvinyl resins are polyvinylacetals, polyvinyl chloride, polyvinylidene chloride polyvinyl acetate or copolymers thereof. Coalescing systems can be supported by resins that are thermosets or thermoplastics, especially those suitable for water-based emulsion or latex systems.

Optional Coating Composition Components

In one embodiment, the coating composition also includes pigment other than the surface-treated barium sulfate. Other pigments that optionally can be additionally used in the coating composition include, for example, titanium dioxide, iron oxide, aluminum bronze, hansa yellow, phthalo green, phthalocyanine blue, and so forth. The coating composition also may contain fillers such as talc, mica, silicate powder, alumina, aluminum trihydroxide, kaolin clay, carbon black, calcium carbonate, calcium silicate, chopped glass, and so forth. The coating compositions also optionally can contain commonly used chemical additives for protective coatings such as corrosion, oxidation, drying, and/or skinning retardants and inhibitors; curing agents; dispersants; dyes, flow control agents, thixotropic agents, adhesion promoters, light stabilizers, curing catalysts, and so forth. The supplemental anticorrosion agents can be, for example, anticorrosion pigments, such as phosphate-, molybdate-, or borate-containing pigments or metal oxide pigments, or other organic or inorganic corrosion inhibitors, for example salts of nitroisophthalic acid, phosphoric esters, industrial amines or substituted benzotriazoles. These optional additives can be used in amounts generally applied for their respective functions.

Flow control agents and thixotropic agents are based, for example, on silicone fluids, fluorochemical surfactants, polyoctyl acrylate resins, modified bentonite clays, high molecular weight polyolefin pastes, hydrogenated castor oil derivatives.

In another embodiment, it is also advantageous to add basic fillers or pigments, which in certain binder systems bring about a synergistic effect on the inhibition of corrosion. Examples of such basic fillers and pigments are calcium silicate, calcium or magnesium oxide, calcium carbonate or magnesium carbonate, zinc oxide, zinc carbonate, zinc phosphate, magnesium oxide, alumina, aluminum phosphate or mixtures thereof. Examples of basic organic pigments are those based on aminoanthraquinone.

The corrosion inhibitors can be added to the surface-coating material during its production, for example during the dispersion of the pigment by milling, or else the inhibitor is dissolved in a solvent and then stirred into the coating composition. The solutions of the corrosion inhibitors can also be used to pretreat the metal surface.

In the preparation of the organic film-forming binder by addition polymerization or polycondensation of monomers, the corrosion inhibitors can be mixed in with the monomers prior to polymerization, either in solid form or in solution.

The coating compositions generally, but not in every case, will also include some level of liquid solvent and/or diluent. Solvents are generally used to thin the coating composition by dissolving or dispersing the film forming particles, while diluents increase the capacity of a solvent for the binder.

As previously indicated, an advantage of the coating compositions of the present invention is that the aminosilane surface treated barium sulfate induces viscosity reductions or control in the coating composition of such a magnitude to permit reductions in the levels of VOC ingredients (liquid solvents and diluents) otherwise needed to thin the coating composition.

As generally known, there are increasing regulatory pressures being brought to reduce and limit VOC and hazardous air pollutant (HAP) levels of coatings. Coatings have traditionally included solvents or diluents to thin the coating from a viscosity standpoint and make it easier to handle and apply, and these solvents have included, for example, methanol, ethanol, isopropanol, xylene, toluene, mineral spirits, methyl isobutyl ketone, ethyl acetate, nitopropane, alkylene glycol alkyl ethers, terpenes, and so forth. However, in the context of exterior (outside) structural coatings in particular, or even large internal structures that also do not permit coating "under a hood" to capture volatized organic materials as the coating dry, the volatile content of the coating generally will be released directly into the surrounding atmosphere.

As demonstrated in the examples described below, coating compositions containing the aminosilane surface treated barium sulfate experienced significant viscosity reductions of such a magnitude that reductions in the levels of VOC ingredients otherwise needed to thin the coating composition are made possible. For example, the coating compositions containing the aminosilane surface treated barium sulfate have viscosities that are more than 50% lower than the viscosities of comparison coating compositions having similar formulations except that the barium sulfate is not surface treated.

Methods

The aminosilane surface treated barium sulfate used in the coating compositions of embodiments of the present invention is prepared by treating either dry, finely divided barium sulfate powder or a barium sulfate slurry with an organosilane having an amino moiety. Effective surface treatments on the barium sulfate particles can be carried out on either physical form (dry or slurry) by using a neat silane or by adding an aqueous emulsion of the silane as more fully described below.

In one illustration, initially, 98 to 99.9 parts by weight of a quantity of barium sulfate (e.g., Huberbrite® 1 or Huberbrite® 7 barium sulfate, or a blend of these) is added to a solids/liquid batch blender. The blender is turned on and 0.1 to 2.0 parts by weight (on an active basis) of the aminosilane is added respectively over approximately 0.1 to 3 minutes so as to yield a total of 100 parts by weight. The total mixing time is preferably 5 to 40 minutes. The preferred treatment level of the silane is from about 0.25% to about 1.5% by weight. Optionally, the barium sulfate may be heated during the dry treatment and subsequent mixing steps. In the case of surface treating a dry barium sulfate powder with aminosilanes at room temperature, the treated barium sulfate product should be allowed to sit for a period of about 24–48 hours prior to its use to insure that the surface reaction is complete.

Alternatively, the dry treatment process can be carried out continuously by adding aminosilanes (neat or as an aqueous solution or emulsion) via a chemical metering pump that is used in combination with a pin mixer, a Bepex turbulizer unit or a similar continuous blending device. If a barium sulfate starting material is to be treated in slurry form, the aminosilane is added slowly to the slurry with good mixing and then mixed for an additional 5 to 30 minutes. The treated barium sulfate slurry is then vacuum filtered and subsequently oven dried or flash-dried under conventional drying conditions. Whether surface treated in dry particulate form or in slurry form followed by drying, the treated barium sulfate product can be optionally post-pulverized to reduce treated particle agglomeration thereby improving its Hegman grind properties. In an alternative non-limiting method, an aqueous solution or emulsion of an aminosilane is used to surface treat the barium sulfate. The aqueous emulsion is preferably prepared from a high-speed dispersion of the aminosilane in water in the presence of a surfactant. In a preferred embodiment, the aqueous emulsion comprises aminosilane in an amount of from about 30% to about 70%, and a nonionic surfactant in an amount of from about 1.0% to about 3.0% of the total formulation (percentages are on an active weight basis).

It has been found that the optimum amount of nonionic surfactant used in preparing the emulsion formulation described above is about 4.0% by weight of the aminosilane component. Further, preferred nonionic surfactants have a hydrophilic lypophilic balance (HLB) value of greater than 9. In one non-limiting embodiment, a nonionic surfactant particularly suited for emulsifying the aminosilane is a polysorbitan monolaurate with 20 moles of ethoxylation available under the trade name Alkamuls PSML-20 from Rhodia. In order to obtain sufficient stability in some circumstances, the emulsions may be prepared at about 50% by weight concentration of aminosilane whereby the corresponding weight concentration of Alkamuls PSML-20 utilized therein would optimally be about 2%. 3-Aminopropyltriethoxysilane, being water-soluble, may be added to the barium sulfate as an aqueous solution.

The aminosilane surface treated barium sulfate is then combined with the curable resin and any other additives, in well established order, with sufficient mixing or blending to provide an essentially uniform dispersion of all the components in the resulting flowable composition.

The coating composition is preferably used as a surface-coating material. The film forming coating compositions of this invention are ready-to-use formulations that can be applied and distributed over a portion of a surface or substrate to be coated by any convenient method and means. The coating compositions of the present invention can be readily formulated in flowable liquid form.

The film forming coating compositions of this invention can be used, for example, as anticorrosive primers, chemical resistance coatings, sealers, top coats, varnishes, and tank linings. These coatings can be applied to a solid surface by spraying, brushing, dipping, electrodeposition, or any other suitable technique.

Applications of the coating compositions include metal corrosion protection (e.g., marine, pipelines), waterproofing (e.g., fabrics, concrete), mechanical protection (e.g., optical surfaces, indoor flooring), and electrical insulation (e.g., wires). In one preferred aspect, the coating compositions are useful as protective coatings, such as surface coatings and linings, such as applied to surfaces of solid metallic substrates. The metallic substrates can be, for example, iron, steel, copper, zinc or aluminum, and their alloys.

In some applications, two or more coats are applied in forming a surface coating or film, either as wet-on-wet or wet-on-dry coating schemes. If corrosion inhibitors used, they are primarily added to the basecoat (primer), since they act in particular at the metal/coating interface. However, they can also be added to the intermediate coat or topcoat as well. Depending on whether the binder is a physically, chemically or oxidatively drying resin or a heat- or radiation-curing resin, the coating is cured at room temperature or by heating (stoving) or by irradiation. The compositions of the present invention form durable continuous thin films that generally can have an average film thickness, upon drying, of about $1 \times 10^{-3}$ to about $25 \times 10^{-3}$ inch, more particularly about $2 \times 10^{-3}$ to about $15 \times 10^{-3}$ inch.

The coating compositions described herein are more blister resistant as compared to similar coating compositions containing barium sulfate that has not been surface treated with an aminosilane or alternatively has been surface treated with a different silane chemistry other than aminosilane. In addition, the film forming coating composition also provides excellent corrosion resistance. This attribute helps eliminate the need for use of undesirable metal pigments for corrosion control.

In addition, the coating compositions of this invention also have relatively low viscosities that are well suited for coating applications. These viscosity reductions are directly associated with the presence of the aminosilane surface treated barium sulfate, as has been demonstrated by experimental studies described below comparing coating compositions including that component to similar coating compositions except containing barium sulfate that has not been surface treated or alternatively has been surface treated with a different silane chemistry other than aminosilane. By inducing the viscosity reductions, the presence of the aminosilane surface treated barium sulfate in the coating composition makes it possible to reduce the amount of solvent or diluent otherwise needed to thin the coating composition, which in turn reduces volatile organic compound (VOC) content in the coating compositions.

The following examples are presented to illustrate the invention, but the invention is not to be considered as limited thereto. In the following examples, parts are by weight unless indicated otherwise.

EXAMPLES

A series of samples of barium sulfate were surface treated with different silane compounds indicated in Table 1 below. The abbreviations used for these silane compounds elsewhere in the examples for sake of convenience are indicated in the table.

TABLE 1

Surface reagents investigated to surface treat barium sulfate.

| | |
|---|---|
| Present Invention | 3-Aminopropyltriethoxysilane[1a] ("AS") |
| Comparison | 3-Glycidoxypropyltrimethoxysilane[1b] ("ES") |
| Comparison | 3-Isocyanatopropyltriethoxysilane[2] ("IS") |
| Comparison | iso-Butyltriethoxysilane[1c] ("iBS") |
| Comparison | Polymethylhydrogensiloxane[3] ("HS") |
| Comparison | None ("N") |

[1]These silanes are available from Degussa Corporation as AMEO[1a], GLYMO[1b], IBTEO[1c], respectively.
[2]3-Isocyanatopropyltriethoxysilane is available from GE Crompton OSi Corp. as A-1310.
[3]Polymethylhydrogensiloxane is available from Dow Corning Corporation under the trade name Silicone Fluid 1107.

Table 2 lists the barium sulfate test samples used and their corresponding descriptions. Fourteen different surface modified barium sulfate pigments were prepared based on three different barium sulfate particle size distributions and five different surface reagents.

The barium sulfates employed herein were Huberbrite® 1, a 1 micron particle sized ground barium sulfate, Huberbrite® 7, a 7 micron particle sized ground barium sulfate, and a 1:4 blend, respectively, of these was used when blended. Blends of different sized barite products were used in some examples to provide a wider distribution of particles sizes. The barite was surface treated with organosilanes having chemistries as described in above Table 1. The surface modified barium sulfate pigments along with their descriptions, are listed in Table 2.

The same general method of preparation that was used to prepare the series of barium sulfate samples surface treated with one of AS, ES, IS, or iBS, was as follows. The surface treated barite of the present invention is prepared by treating either dry, finely divided barite powder or a barite slurry with an aminosilane. Effective surface treatments on the barium sulfate particles can be carried out on either physical form (dry or slurry) by using a neat silane or by adding an aqueous solution for the water soluble aminosilanes or as an aqueous emulsion for the water insoluble aminosilanes as more fully described below. Initially, 98 to 99.9 parts by weight of a quantity of barium sulfate (e.g., Huberbrite® 1 or Huberbrite® 7 barium sulfate) is added to a solids/liquid batch blender. The blender is turned on and 0.1 to 2.0 parts by weight (on an active basis) of the aminosilane is added respectively over approximately 0.1 to 3 minutes so as to yield a total of 100 parts by weight, The total mixing time is preferably 5 to 40 minutes. The preferred treatment level of the aminosilane is from about 0.5% to about 1.5% by weight. Optionally, the barite may be heated during the dry treatment and subsequent mixing steps. In the case of surface treating a dry barite powder with aminosilane at room temperature, the treated barite product should be allowed to sit for a period of about 24–48 hours prior to its use to insure that the surface reaction is complete.

Alternatively, the dry treatment process can be carried out continuously by adding an aminosilane (neat, aqueous solution, or as an aqueous emulsion) via a chemical metering pump that is used in combination with a pin mixer, a Bepex turbulizer unit or a similar continuous blending device. If a barite starting material is to be treated in slurry form, the aminosilane is added slowly to the slurry with good mixing and then mixed for an additional 5 to 30 minutes. The treated barite slurry is then vacuum filtered and subsequently oven dried or flash-dried under conventional drying conditions. Whether surface treated in dry particulate form or in slurry form followed by drying, the treated barite product can be optionally post-pulverized to reduce treated particle agglomeration thereby improving its Hegman grind properties.

The method of preparation of the comparison polymethylhydrogensiloxane modified barium sulfate, i.e., B1+B7/HS, was the same as that described in U.S. Pat. No. 6,194,070, which descriptions are incorporated herein by reference.

TABLE 2

Barium Sulfate Samples.

| Barite Sample | Description of Surface Treatment Applied |
|---|---|
| Base (untreated) barium sulfates | |
| B1 | 1 micron MPS, dry ground barium sulfate[1] |
| B7 | 7 micron MPS, dry ground barium sulfate[2] |
| B1 + B7 | Blend of a 1:4 weight ratio of B1 and B7 |
| Surface reagent modified barium sulfate blend/(silane) | |
| B1 + B7/AS | B1 + B7 blend surface modified with 0.55 wt. % AS |
| B1 + B7/ES | B1 + B7 blend surface modified with 0.55 wt. % ES |
| B1 + B7/IS | B1 + B7 blend surface modified with 0.55 wt. % IS |
| B1 + B7/iBS | B1 + B7 blend surface modified with 0.55 wt. % iBS |
| B1 + B7/HS | B1 + B7 blend surface modified with 0.55 wt. % HS |

[1]Huberbrite ® 1: barium sulfate available from J. M. Huber Corporation
[2]Huberbrite ® 7: barium sulfate available from J. M. Huber Corporation Table 3 sets forth some typical physical properties of the aminosilane treated barium sulfate product that was produced by surface treating a 1:1 blend of Huberbrite® 1 and Huberbrite® 7 barium sulfate with 0.55% by weight of the aminosilane ("AS").

TABLE 3

| | AS-Treated Barium Sulfate |
|---|---|
| General Specifications | |
| Moisture, 105° C. (max), % | 0.5 |
| Screen Residue*, 325 mesh (max), % | 0.1 |
| Hegman Grind ASTM D-1210 | 4–7 |

TABLE 3-continued

| | AS-Treated Barium Sulfate |
|---|---|
| Physical Properties | |
| Form | Fine Powder |
| bulk density, loose (lb/ft³) | 50–60 |
| bulk density, tamped (lb/ft³) | 76–80 |

A modified test procedure was used for determining the % screen residue of a treated barium sulfate product, as follows: Using 100.0 grams of pigment, a 38% solids dispersion in ethanol was produced and poured through a 325 mesh sieve screen. After washing with an additional 100 gm quantity of ethanol, the residue was dried, collected and then weighed.

Several illustrative, non-limiting generalized coating formulations, Coatings 1 and 2, representing this invention are set forth below in Table 4, which were employed in Examples 1–3 described below.

Both the epoxy/polyamide and epoxy/cycloaliphatic amine binder systems used were based on a low molecular weight epoxy resin. Epoxy bases were all made by combining the formulation ingredients in the order shown in Table 4 in a metal mixing container and mixed on a high-speed disperser such as a Cowles disperser with a high shear blade for three minutes each. There was no pigmentation of the epoxy curing agent component though this is an optional procedure. Each coating sample (in its unmixed state) was allowed to remain at room temperature for two weeks prior to the curing agent being added.

After that time, the coating samples were mixed with the curing agent and the initial viscosities of each of the coating samples were measured in units of cP (MPats) using a Brookfield RVT Rotational Viscometer equipped with spindle # 4 (with some exceptions—spindles 5 and 6 had to be employed with some of the higher viscosity systems). All viscosity measurements were performed at 50 r.p.m. within one hour of mixing.

TABLE 4.

High PVC 2-Part Barrier Coating Formulations.

| | Coating 1 Polyamide 43.8% PVC | | Coating 2 Cycloaliphatic amine 45.1% PVC | |
|---|---|---|---|---|
| Ingredient | Lbs. | gals | Lbs. | gals |
| Part 1: | | | | |
| epoxy resin[1] | 302.2 | 31.2 | 302.16 | 31.2 |
| Xylene | 23.4 | 3.23 | 23.4 | 3.23 |
| Rheology modifier[2] | 15.0 | 1.11 | 15 | 1.11 |
| air-release agent[3] | 0.070 | 0.0091 | 0.070 | 0.0091 |
| n-butyl alcohol | 2.9 | 0.43 | 2.9 | 0.43 |
| Methylethyl ketone | 12.5 | 1.86 | 12.5 | 1.86 |
| titanium oxide[4] | 500 | 15.0 | 500 | 15.0 |
| barium sulfate[5] | 1000 | 27.4 | 1000 | 27.4 |
| Nepheline syenite | (596.0) | (27.4) | (596.0) | (27.4) |
| Amorphous silica[6] | (604.8) | (27.4) | (604.8) | (27.4) |
| Xylene | 255 | 35.2 | 255 | 35.2 |
| flow control agent[7] | 9.09 | 1.04 | 9.09 | 1.04 |
| Part 2: | | | | |
| Polyamide crosslinking agent[8] | 202.16 | 24.1 | 0 | 0 |
| Cycloaliphatic amine crosslinking agent[9] | 0 | 0 | 182.58 | 21.2 |
| TOTAL | 2322 | 140 | 2303 | 138 |

[1]Polyepoxide resins based on diglycidyl ether of bisphenol A such as Epon 828 ®. Epoxy phenol, novolac resins, halogenated polyepoxide resins, Cycloaliphatic polyepoxide resins, and solutions thereof might also have been used with compensation for equivalent weight.
[2]Bentone SD-2. Other thixatropes might have been used such as high molecular weight polyolefins (MPA-1078X), hydrogenated castor oil derivatives (Thixatrol ST) fumed silicas such as but not limited to, Cab-O-Sil TS-720, TS-610, TS-530, M-5 ®, other treated clays such as Bentone 38 ® and Bentone SD-1 ®, polyamide waxes such as Crayvallac Extra ®, attapulgite clays such as Attagel 50 ®, mixed mineralthixotropes such as Garamite 1958 ®, or equivalents.
[3]Silicone-free air release agents, such as Dehydran ARA 7219 ®, supplied by Cognis.
[4]Titanium oxide such as TiPure R-706 ® supplied by Dupont.
[5]Barium sulfate substrates with median particle diameters of 1–7 microns, such as, but not limited to, Huberbrite ® 1 and Huberbrite ® 7 made by J.M. Huber Corp. with organosilane surface treatments as described herein.
[6]Amorphous silica such as Zeodent ® silicas, commercially available from J.M. Huber Corporation.
[7]A flow control agent such as urea-formaldehyde resin commercially available as Cymel U 216-8 ® , supplied by Cytec
[8]Modified and unmodified aliphatic polyamides, such as Ancamide 2050 ® and Versamid 253 ®.
[9]Modified and unmodified cycloaliphatic polyamines, such as Ancamine 1618 ® (Air Products) or Versamine C-30 (Cognis)

The amounts of nepheline syenite and amorphous silica are indicated parenthetically to indicate that they are used only in separate comparison compositions used in place of the barium sulfate component (replacement made on volumetric basis), but the remainder of the indicated composition is the same for those comparison compositions.

In order to test the performance of these coating compositions and the effect thereon of the surface treatment provided on the barium sulfate, the following runs were conducted.

EXPERIMENTAL PROTOCOL

Ground steel panels (4"×8") were coated at about 4.5±0.5 mils (dry) with each of the coating samples indicated below for performance testing in salt spray in accordance with ASTM B 117. The panels were scribed to the metal with a tungsten carbide scribing tool after backing and edging with adhesive vinyl tape.

Each panel was evaluated and the results are listed in Tables 5 and 6 under the categories of "General Scribe Corrosion" for deterioration at the scribe including blistering and corrosive undercutting at the scribe.

"Blistering Degree" and "Blistering Size" were evaluated over the remainder of the panel. Blistering was assessed according to modified version of ASTM 714. The degree of blistering was assessed numerically so that the qualitative ASTM assessment of blistering degree of "Few" is assessed as 8, "Medium" as 6, "Medium Dense" as 4 and "Dense" as 2, and no blisters is assessed as 10.

Scribe deterioration was evaluated using a template based on Table 5 of ASTM D 1654. Evaluations were assessed on the basis of the furthest encroachment of corrosion or blister formation into the general panel area from the scribe line.

After these evaluations, the films were stripped from the lower half of each panel and the condition of the bare steel in the general area beneath the coating and of the steel along the scribe line were evaluated. These results are listed under "Bare Panel Corrosion" and "Bare Scribe Corrosion" also in Tables 5 and 6. These evaluations were made according to ASTM D 610. At the end of the evaluations, all five-evaluation criteria were averaged to give a single "Average Panel Rating" value for each coating sample.

EXAMPLE 1

5% Salt Spray Corrosion Results of Barium sulfate—Poxy Coating Formulations

Corrosion results using the high PVC epoxy-polyamide formulations of Coating 1 are shown in Table 5. The epoxy resin was Epon 828; the rheology modifier was Bentone SD-2; the air-release agent was Dehydran ARA 7219; the flow control agent was Cymel U 216-8; the polyamide crosslinking agent was Versamide 253; otherwise the ingredients used in the tested coating composition were the compounds already specifically set forth in Table 4 for Coating 1.

The data are sorted in descending order by blistering degree and average panel rating which is an average of all other corrosion categories. Individual corrosion values are averages of two test panels.

All surface treatments significantly improved bare panel corrosion over untreated barium sulfate. All surface treatments except iBS significantly improve bare scribe corrosion and average panel rating and also attenuate blister size. The formulation containing AS-treated barium sulfate completely prevented formation of blistering and gave the best result.

Figure 2:
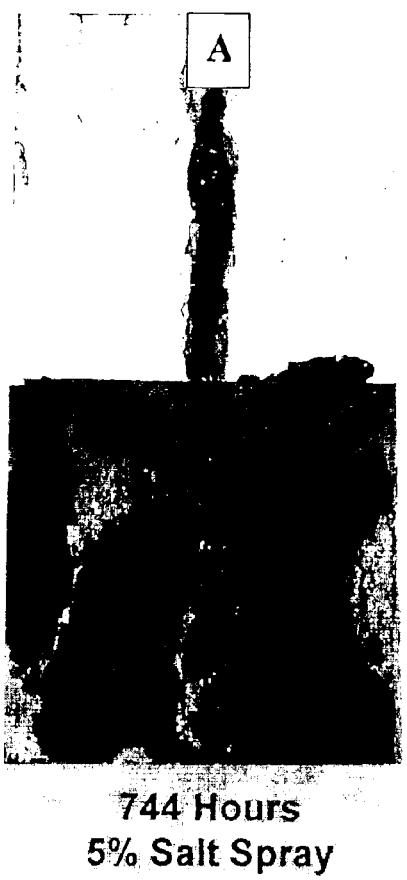
FIGS. 2 and 3 are photographs of steel panels that have been coated with a film formed with two-part epoxy binder compositions comprising epoxy and amine curing agent components coated and cured on the steel panels, which then were exposed to 744 hours of a 5% salt spray. The two-part epoxy binder composition is removed from the bottom half of each panel to show the extent of steel corrosion.
Figure 3:
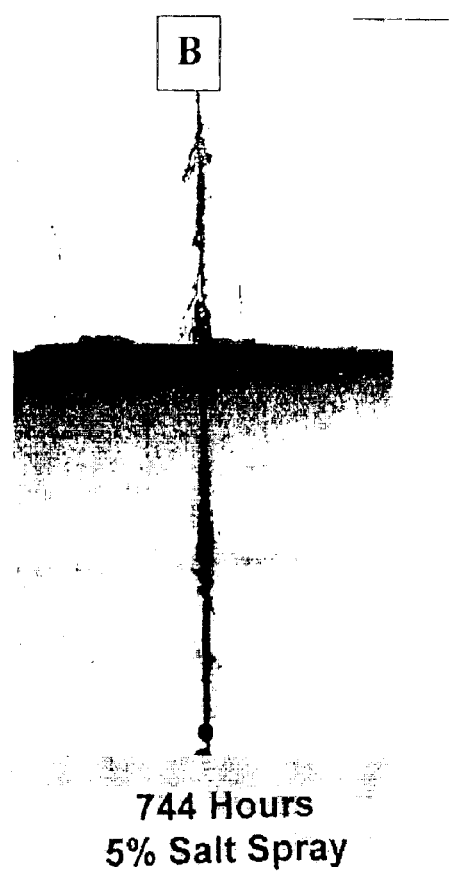

FIGS. 2 and 3 are photographs of the poorest performing and best performing epoxy-polyamide coated steel panels from Table 1 which were exposed to 5% salt spray for 744 hours with bottom half of the coating removed. Thus photograph A shown in FIG. 2 is of the coating containing unmodified 1 micron and 7 micron blended barium sulfate, and photograph B shown in FIG. 3 is of the coating containing 1 micron and 7 micron blended barium sulfate surface modified with 3-aminopropyltri-ethoxysilane (AS).

TABLE 5

Salt spray corrosion results of surface modified barium sulfate in a high PVC epoxy-polyamide coating on steel; 744 hr.

| Single surface reagent modified barite blend | General Scribe Corrosion | Blistering Degree | Blistering Size | Bare Panel Corrosion | Bare Scribe Corrosion | Average Panel Rating |
|---|---|---|---|---|---|---|
| B1 + B7/AS | 5.5 | 10.0 | 10.0 | 10.0 | 8.3 | 8.9 |
| B1 + B7/HS | 5.0 | 6.5 | 5.0 | 8.0 | 6.3 | 6.8 |
| B1 + B7/ES | 6.0 | 3.0 | 4.0 | 10.0 | 7.5 | 6.8 |
| B1 + B7/IS | 5.0 | 2.5 | 5.0 | 9.0 | 7.0 | 6.4 |
| B1 + B7/iBS | 3.0 | 2.5 | 2.5 | 5.0 | 3.5 | 4.4 |
| B1 + B7 | 3.0 | 2.5 | 2.5 | 1.5 | 1.5 | 3.4 |

EXAMPLE 2

Corrosion results using the high PVC epoxy-cycloaliphatic amine formulations of Coating 2 (Table 4) are shown in Table 6. The epoxy resin was Epon 828; the rheology modifier was Bentone SD-2; the air-release agent was Dehydran ARA 7219; the Flow control agent was Cymel U 216-8; the cycloaliphatic amine crosslinking agent was Ancamine 1618; otherwise the ingredients used in the tested coating composition were the compounds already specifically set forth in Table 4 for Coating 2.

The epoxy-cycloaliphatic amine coating formulation provides a more rigid, inflexible coating in which to test the anti-corrosion properties of the surface modified barium sulfates. The data are sorted in descending order by bare panel corrosion.

TABLE 6

Salt spray corrosion results of surface modified barium sulfate in a high PVC epoxy-cycloaliphatic amine coating on steel; 720 hr.

| Single surface reagent modified barite blend | General Scribe Corrosion | Blistering Degree | Blistering Size | Bare Panel Corrosion | Bare Scribe Corrosion | Average Panel Rating |
|---|---|---|---|---|---|---|
| B1 + B7/HS | 6.8 | 3.5 | 4.0 | 10.0 | 4.5 | 6.5 |
| B1 + B7/AS | 3.0 | 2.5 | 2.5 | 5.5 | 2.0 | 4.3 |
| B1 + B7/IS | 0.0 | 0.0 | 0.0 | 5.0 | 2.0 | 2.8 |
| B1 + B7/ES | 0.0 | 0.0 | 0.0 | 3.5 | 4.0 | 2.9 |
| B1 + B7/iBS | 6.5 | 1.0 | 1.0 | 1.5 | 2.0 | 3.4 |
| B1 + B7 | 0.0 | 0.0 | 0.0 | 0.5 | 0.5 | 1.7 |

The formulation containing HS treated barium sulfate completely prevented bare panel corrosion, while the formulation containing the AS-treated barium sulfate performed well in preventing formation of blistering in this different type of resin-based coating system, showing that it had excellent versatility and superior blister-inhibition properties over widely different resin-based coating formulations. The untreated barium sulfates again performed relatively poorly.

Additional experimental studies performed revealed that the single AS reagent gave particularly high corrosion performance. The untreated barium sulfate had the worst anti-corrosion performance as measured by the average panel rating.

Additional studies also demonstrated that the aminosilane surface modified barium sulfates out performed conventional pigments, such as amorphous silica and nepheline syenite, in both average panel rating and in particular, blister prevention. In this regard, both nepheline syenite and amorphous silica were substituted for the aminosilane treated barium sulfate for use as control coatings and their quantities were based on an equal volume to the volume of barium sulfate used. The untreated barium sulfates, amorphous silica and nepheline syenite were the worst corrosion performers.

EXAMPLE 3

Viscosity of Surface Treated Barium Sulfate/Epoxy Coating Formulations

The viscosity of the various barium sulfate-epoxy coating formulations measured at fixed PVC are shown in FIG. 4 in order of decreasing viscosity. These data were measured on the 1:4 B1/B7 blended barium sulfate as blended in coating compositions prepared according to the respective epoxy-polyamide and epoxy-cycloaliphatic amine formulations of Table 4.

The most viscous coating observed was the untreated barium sulfate. All surface modified barium sulfate samples gave lower viscosity than untreated barium sulfate. However, as shown in FIG. 4, the coating compositions having the amino-silane treated barium sulfate included possessed the lowest viscosity property of all the tested samples. The coating composition having the amino-silane treated barium sulfate ("AS") had a viscosity more than 50% lower than the viscosity measured for the same coating composition except prepared with the barium sulfate lacking surface treatment with the organosilane having the amino moiety (i.e., run "N"), wherein the viscosity measurement is made in centipoise with a Brookfield RVT Rotational Viscometer.

The epoxy-polyamide viscosity results approximately follow the same decreasing viscosity pattern seen for the epoxy-cycloaliphatic amine viscosity results. However, the epoxy-polyamide viscosities are consistently lower than the epoxy-cycloaliphatic amine viscosities. Lower viscosities at fixed PVC alternately allow the coating formulator to increase the PVC, which gives the desirable lower VOC.

As is readily apparent from the figures, the coatings with barium sulfate treated in accordance with the present invention yields superior resistance to blistering, higher corrosion resistance and lower coating viscosities as compared to untreated barium sulfate in epoxy coatings.

The present invention may be embodied in other specific forms without departing from the spirit or essential attributes thereof and accordingly reference should be made to the appended claims rather than the foregoing specification as indicating the scope of the invention.

What is claimed is:

1. A flowable liquid coating composition useful for forming a film, comprising, in admixture, a resin and particles comprising barium sulfate wherein barium sulfate at an exterior surface of the particles has been surface treated with an organosilane containing an amino moiety.

2. The coating composition according to claim 1, wherein the coating composition has a viscosity more than 50% lower than a viscosity measured for the same coating composition except prepared with the barium sulfate lacking surface treatment with the organosilane having the amino moiety, wherein the viscosity measurement is made in centipoise with a Brookfield RVT Rotational Viscometer.

3. The coating composition according to claim 1, wherein the particles have a median particle size in the range of approximately 0.1 to approximately 40 microns.

4. The coating composition according to claim 1, wherein the organosilane containing an amino moiety includes an amino group selected from at least one of a primary, a secondary, or a tertiary amine.

5. The coating composition according to claim 1, wherein the organosilane containing an amino moiety is represented by the following formula:

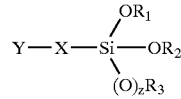

wherein $R_1R_2$, $R_3$ each independently is selected from hydrogen, lower alkyl, aryl, lower alkylaryl, or lower arylalkyl, z is 0 or 1, Y is selected from the group consisting of a substituted or nonsubstituted amino-containing group, and X is a non-substituted or substituted hydrocarbenyl linking group.

6. The coating composition according to claim 1, wherein the organosilane containing an amino moiety is added onto the surface of the barium sulfate when surface treated with the organosilane in an amount of about 0.1% to about 2%, based on dry weight of the barium sulfate before the addition.

7. The coating composition according to claim 1, comprising a pigment which at least in part is comprised by the particles that have been surface treated with the organosilane containing the amino moiety.

8. The coating composition according to claim 7, wherein the pigment comprises about 1 to about 65% by volume of the coating composition.

9. The coating composition according to claim 7, wherein the pigment has a total volume, and the barium sulfate comprises about 1 to about 100% of the total volume of the pigment.

10. The coating composition according to claim 1, wherein the resin comprises a curable resin.

11. The coating composition according to claim 1, wherein the resin comprises a curable resin selected from the group consisting of epoxy resins, polyurethane resins, alkyd resins, melamine resins, phenolic resins, polyester resins, individually or in combinations thereof.

12. The coating composition according to claim 10, wherein the curable resin comprises an epoxy resin and a curing agent.

13. The coating composition according to claim 1, wherein the coating composition comprises a water-based emulsion or latex system forming a film upon water evaporation therefrom.

14. The coating composition according to claim 1, wherein the resin comprises a thermoplastic resin.

15. The coating composition according to claim 1, having a pigment volume concentration (PVC)/critical pigment volume concentration (CPVC) ratio value of 0.1 to 0.95.

16. A dry film, comprising a dried coating having an average film thickness of about $1 \times 10^{-3}$ to about $25 \times 10^{-3}$ inch and the coating having a composition comprising a thermoset resin into which is dispersed particles comprising barium sulfate wherein barium sulfate at an exterior surface of the particles has been surface-treated with organosilane containing an amino moiety.

17. A method of providing a flowable liquid coating film on a solid substrate surface comprising:

applying a flowable liquid coating composition on the substrate surface as a film, wherein the coating composition comprises a resin system, and a dispersion in the resin system, wherein the dispersion comprises a pigment including particles comprising barium sulfate wherein barium sulfate at an exterior surface of the particles has been surface treated with an organosilane containing an amino moiety, and drying or permitting drying of the film to form a dried film from the applied coating composition, which film is attached to the solid substrate surface.

18. The method of claim 17, wherein the resin comprises a curable resin which is selected from the group consisting of epoxy resins, polyurethane resins, alkyd resins, melamine resins, phenolic resins, polyester resins, individually or in combinations thereof.

19. The method of claim 17, wherein the resin system comprises a mixture of first and second components, wherein the first component comprises a curable resin, and the second component comprises a curing agent for the curable resin.

20. The method of claim 17, wherein the resin system comprises a water-based emulsion or latex system forming a film upon water evaporation therefrom.

21. The method of claim 17, wherein the resin comprises a thermoplastic resin.

22. The method of claim 17, wherein the applying is performed effective that the coating composition forms a dry film having an average film thickness of about $1\times10^{-3}$ to about $25\times10^{-3}$ inch.

23. The method of claim 17, wherein the contacting of the substrate surface with coating composition is repeated at least once.

24. The method of claim 17, wherein the contacting of the substrate surface with the coating composition comprises using an application technique selected from at least one of brushing, spraying, blade coating, rolling, or dipping.

25. The method of claim 17, wherein the substrate surface is a metallic surface.

26. The coated substrate product of the method of claim 17.

27. The coating composition of claim 10, wherein the curable resin comprises about 10 to about 30 weight % of the coating composition.

28. A coating composition useful for forming a film, comprising, in admixture, a resin and barium sulfate particles that have been surface treated with an organosilane containing an amino moiety, wherein the coating composition has a viscosity more than 50% lower than a viscosity measured for the same coating composition except prepared with the barium sulfate lacking surface treatment with the organosilane having the amino moiety, wherein the viscosity measurement is made in centipoise with a Brookfield RVT Rotational Viscometer.

29. The method of claim 17, wherein the flowable liquid coating composition being formulated to have a viscosity more than 50% lower than a viscosity measured for the same coating composition except prepared with the barium sulfate lacking surface treatment with the organosilane having the amino moiety, wherein the viscosity measurement is made in centipoise with a Brookfield RVT Rotational Viscometer.

30. The method of claim 18, comprising curing the flowable liquid composition at room temperature during said drying.

* * * * *